United States Patent
Hari et al.

(10) Patent No.: US 10,193,437 B1
(45) Date of Patent: Jan. 29, 2019

(54) BRIDGELESS AC-DC CONVERTER WITH POWER FACTOR CORRECTION AND METHOD THEREFOR

(71) Applicant: SEMICONDUCTOR COMPONENTS INDUSTRIES, LLC, Phoenix, AZ (US)

(72) Inventors: Ajay Karthik Hari, Scottsdale, AZ (US); Nikhilesh S. Kamath, Chandler, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/795,025

(22) Filed: Oct. 26, 2017

(51) Int. Cl.
*H02M 1/42* (2007.01)
*H02M 7/217* (2006.01)
*H02M 1/00* (2006.01)

(52) U.S. Cl.
CPC ......... *H02M 1/4208* (2013.01); *H02M 7/217* (2013.01); *H02M 2001/0009* (2013.01)

(58) Field of Classification Search
CPC ...... H02M 1/42; H02M 1/4208; H02M 1/425; H02M 1/4258; H02M 7/217; H02M 2001/0009
See application file for complete search history.

(56) References Cited

U.S. PATENT DOCUMENTS

| | | | | |
|---|---|---|---|---|
| 8,576,597 B2 * | 11/2013 | Liquicia | ............... | H02M 1/4208 363/126 |
| 9,490,694 B2 * | 11/2016 | Alam | ................... | H02M 1/4241 |
| 2012/0069615 A1 * | 3/2012 | Tomioka | ............. | H02M 1/4208 363/126 |
| 2015/0180330 A1 | 6/2015 | Ye | | |
| 2016/0241132 A1 * | 8/2016 | Lin | ...................... | H02M 1/4225 |
| 2017/0214314 A1 * | 7/2017 | Jitaru | ................... | H02M 1/4225 |

OTHER PUBLICATIONS

Transphorm, Application Note, "TDPS500E2C1Totem Pole PFC Evaluation Board," Feb. 21, 2014, 24 pages.
(Continued)

*Primary Examiner* — Matthew Nguyen
(74) *Attorney, Agent, or Firm* — Polansky & Associates, P.L.L.C.; Paul J. Polansky

(57) ABSTRACT

In one form, a bridgeless AC-DC converter includes a totem pole network having a first input adapted to be coupled to a second terminal of an AC voltage source, a second input adapted to be coupled to a first terminal of the AC voltage source through an inductor, an output terminal for providing an output voltage, and a return terminal, an output capacitor coupled between the output terminal and an output ground terminal, a sense element coupled between the return terminal and the output ground terminal, and a controller circuit coupled to the return terminal of the totem pole network. The controller circuit modulates an on time of an active switch in the totem pole network on a cycle-by-cycle basis by shortening the on time corresponding to an amount of time a current sense signal derived from a current through the sense element exceeds a current limit threshold.

22 Claims, 7 Drawing Sheets

(56) References Cited

OTHER PUBLICATIONS

Bin Su, Junming Zhang and Zhengyu Lu, "Totem-Pole Boost Bridgeless PFC Rectifier With Simple Zero-Currenl Detection and Full-Range ZVS Operating at the Boundary of DCM/CCM," IEEE Transactions on Power Electronics, vol. 26, No. 2, Feb. 2011, 9 pages.

Eka Firmansya, Satoshi Tomioka, Seiya Abe, Masahito Shoyama and Tamotsu Ninomiya, "Totem-Poe Power-Factor-Correction Converter under Critical-Conduction-Mode Interleaved Operation," EICE Trans. Commun., vol. E93-B, No. 9, Sep. 2010, 7 pages.

\* cited by examiner

BRIDGELESS AC-DC CONVERTER WITH POWER FACTOR CORRECTION AND METHOD THEREFOR

FIELD OF THE DISCLOSURE

This disclosure relates generally to power converters, and more specifically to bridgeless AC-DC converters.

BACKGROUND

Switched mode power supplies can be used to create a direct current (DC) voltage from an alternating current (AC) voltage by switching current through an element such as an inductor. Offline converters receive a voltage from an AC source or mains and form a bulk voltage, which may then be converted into a different voltage for use by low-voltage circuitry. Typically an AC input voltage is converted into a full-wave rectified voltage in a diode bridge rectifier and smoothed before being converted into a lower voltage. One particularly useful feature for offline converters is power factor correction. A power factor controller may be used in an offline converter to ensure that power is being efficiently delivered to a load with a high power factor by keeping the voltage and current waveforms in phase.

This typical AC-DC topology, however, requires the use of a diode bridge rectifier. The diode bridge rectifier requires four discrete high-power diodes, which are inexpensive—however they create losses and generate heat in the system, impacting the efficiency and power density. In order to overcome these problems, some recent converters have adopted bridgeless, totem-pole architectures. Bridgeless totem-pole converters use different circuit paths to deliver current to the load based on the phase of the AC input signal, and providing power factor correction in bridgeless totem pole converters while preserving their low cost has been difficult.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
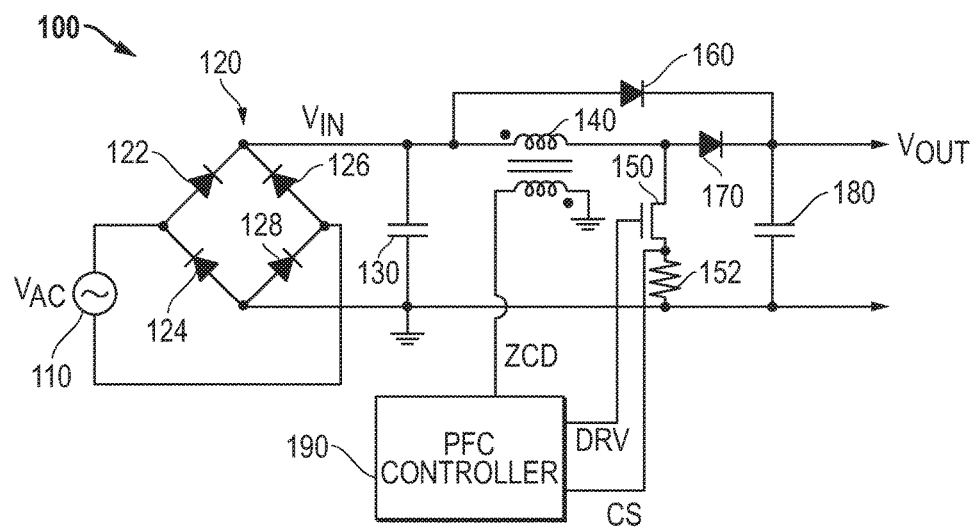
FIG. 1 illustrates in partial block diagram and partial schematic form an AC-DC converter using a bridge rectifier with power factor control according to the prior art.

FIG. 1 illustrates in partial block diagram and partial schematic form an AC-DC converter 100 using a bridge rectifier with power factor correction according to the prior art. AC-DC converter 100 includes generally an AC voltage source 110, a bridge rectifier 120, a bulk capacitor 130, an inductor 140, a transistor 150, a resistor 152, diodes 160 and 170, an output capacitor 180, and a power factor control (PFC) controller 190. AC voltage source 110 has first and second terminals and provides a voltage labeled "$V_{AC}$".

Bridge rectifier 120 includes diodes 122, 124, 126, and 128. Diode 122 has an anode connected to the first terminal of AC voltage source 110, and a cathode for provide an input voltage labeled "$V_{IN}$". Diode 124 has an anode connected to a bulk ground, and a cathode connected to the first terminal of AC voltage source 110. Diode 126 has an anode connected to the second terminal of AC voltage source 110, and a cathode connected to the cathode of diode 122. Diode 128 has an anode connected to bulk ground, and a cathode connected to the second terminal of AC voltage source 110.

Bulk capacitor 130 has a first terminal connected to the cathodes of diodes 122 and 126, and a second terminal connected to bulk ground. Inductor 140 has a primary winding and a coupled secondary winding. The primary winding has a first end connected to the cathodes of diodes 122 and 126, and a second end. The secondary winding has a first end connected to bulk ground, and a second end for providing a signal labeled "ZCD".

Transistor 150 is an N-channel power metal oxide semiconductor (MOS) transistor having a drain connected to the second end of the primary winding of inductor 140, a gate for receiving a signal labeled "DRV", and a source. Resistor 152 has a first terminal connected to the source of transistor 150 and providing a current sense signal labeled "CS", and a second terminal connected to bulk ground.

Diode 160 has an anode connected to the cathodes of diodes 122 and 126, and a cathode for providing a voltage labeled "$V_{OUT}$". Diode 170 has an anode connected to the second end of the primary winding of inductor 140, and a cathode connected to the cathode of diode 160. Capacitor 180 has a first terminal connected to the cathodes of diodes 160 and 170, and a second terminal connected to bulk ground. PFC controller 190 has an input connected to the second end of the secondary winding of inductor 140 for receiving the ZCD signal, an input connected to the first terminal of resistor 152 for providing the CS signal, and an output connected to the gate of transistor 150 for providing the DRV signal.

In operation, AC voltage source 110 is a voltage source such as an AC mains that provides a sinusoidal waveform at, e.g., 50 Hertz (Hz) or 60 Hz. Bridge rectifier 120 converts the AC signal input a full wave rectified signal (i.e., a haversine signal). Bulk capacitor 130 smoothes the ripple in the haversine signal. Inductor 140 develops the ZCD signal and provides it to PFC controller 190, and it indicates that the core of inductor 140 is reset when ZCD drops to zero. Diodes 160 and 170 provide $V_{OUT}$ as the greater of $V_{IN}$ and the voltage at the second end of the primary winding of inductor 140, and output capacitor 180 uses it to smoothe $V_{BULK}$.

PFC controller 190 switches transistor 150 on and off to bring the current waveform in phase with the voltage waveform and thus achieve high power factor.

While AC-DC converter 100 uses a common offline (AC-DC) topology, bridge rectifier 120 adds considerable power losses. For example a typical 115-volt system, bridge rectifies 120 can consume almost 2 watts (W) with a 160 W load. Moreover bridge rectifier 120 is bulky due to the required four power diodes and a heat sink.

Figure 2:
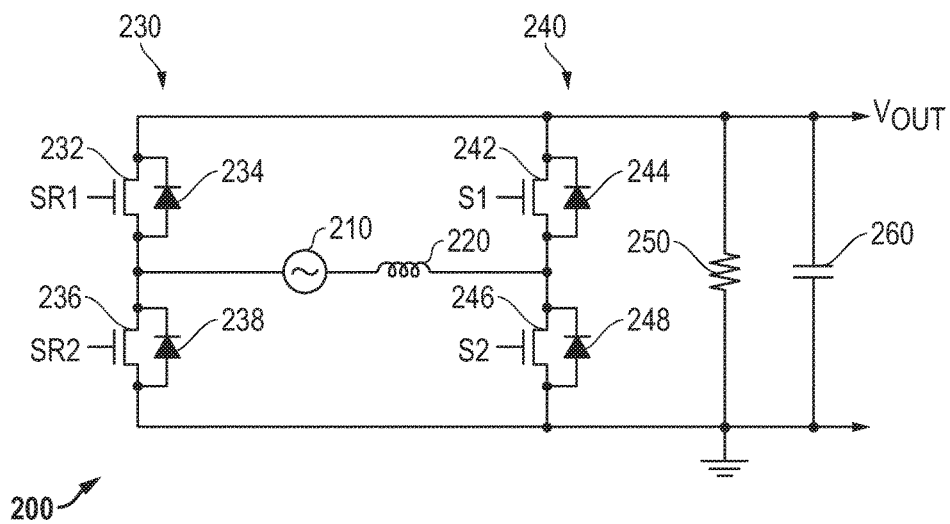
FIG. 2 illustrates in partial block diagram and partial schematic form a bridgeless AC-DC converter with power factor control according to the prior art.

FIG. 2 illustrates in partial block diagram and partial schematic form a bridgeless AC-DC converter 200 with power factor correction according to the prior art. Bridgeless AC-DC converter 200 is bridgeless and uses a totem pole topology. Bridgeless AC-DC converter 200 includes generally an AC voltage source 210, an inductor 220, a rectification leg 230, a switching leg 240, a load 250, and an output capacitor 260.

AC voltage source 210 has first and second terminals. Inductor 220 has a first terminal connected to the first terminal of AC voltage source 210, and a second terminal.

Rectification leg 230 includes transistors 232 and 236. Transistor 232 is an N-channel power MOS transistor having a drain for providing an output voltage labeled "$V_{OUT}$", a gate for receiving a signal labeled SR1, and a source connected to the second terminal of AC voltage source 210. Transistor 232 has an associated body diode 234 having an anode connected to the source of transistor 232, and a cathode connected to the drain of transistor 232. Transistor 236 is an N-channel power MOS transistor having a drain connected to the second terminal of AC voltage source 210, a gate for receiving a signal labeled "SR2", and a source connected to bulk ground. Transistor 236 has an associated body diode 238 having an anode connected to bulk ground, and a cathode connected to the drain of transistor 236.

Switching leg 240 includes transistors 242 and 246. Transistor 242 is an N-channel power MOS transistor having a drain connected to the drain of transistor 232, a gate for receiving a signal labeled "S1", and a source connected to the second terminal of inductor 220. Transistor 242 has an associated body diode 244 having an anode connected to the source of transistor 242, and a cathode connected to the drain of transistor 242. Transistor 246 is an N-channel power MOS transistor having a drain connected to the second terminal of inductor 220, a gate for receiving a signal labeled "S2", and a source connected to bulk ground. Transistor 246 has an associated body diode 248 having an anode connected to bulk ground, and a cathode connected to the drain of transistor 246.

Load resistor 250 has a first terminal connected to the drains of transistors 232 and 242, and a second terminal connected to bulk ground. Capacitor 260 has a first terminal connected to the drains of transistors 232 and 242, and a second terminal connected to bulk ground.

In operation, a controller (not shown in FIG. 2) activates a selected transistor in rectification leg 230 based on the phase of the AC signal output by AC voltage source 210. When the output of AC voltage source 210 is negative between its first and second terminals, the controller makes transistor 236 conductive while keeping transistor 232 non-conductive. The controller switches transistors 242 and 246 selectively and alternatively to provide $V_{OUT}$ with high power factor. When AC voltage source 210 provides a positive voltage between its first and second terminals, the controller makes transistor 232 conductive while keeping transistor 236 non-conductive. The controller switches transistors 242 and 246 selectively and alternatively to provide $V_{OUT}$ with high power factor. Additional details of the operation of bridgeless AC-DC converter 200 will now be described.

Figure 3:
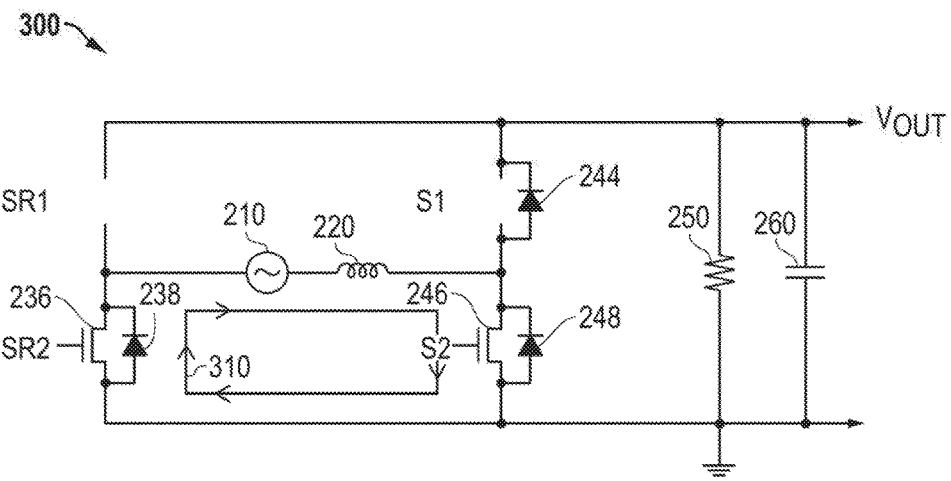
FIG. 3 illustrates in schematic form a current flow diagram of the bridgeless AC-DC converter of FIG. 2 during a first portion of a positive half-cycle of the AC input voltage.

FIG. 3 illustrates in schematic form a current flow diagram 300 of the bridgeless AC-DC converter of FIG. 2 during a first portion of a positive half-cycle of the AC input voltage. Current flow diagram 300 shows that the controller has made transistor 232 and 242 inactive and transistors 236 and 246 active, and bridgeless AC-DC converter 200 conducts current in a current loop 310. During this phase, inductor 220 builds up flux and stores energy between the second and first terminals thereof, and output capacitor 260 maintains $V_{OUT}$ by providing energy to the load. Current can be detected by placing a current sense resistor between the source of transistor 246 and bulk ground.

Figure 4:
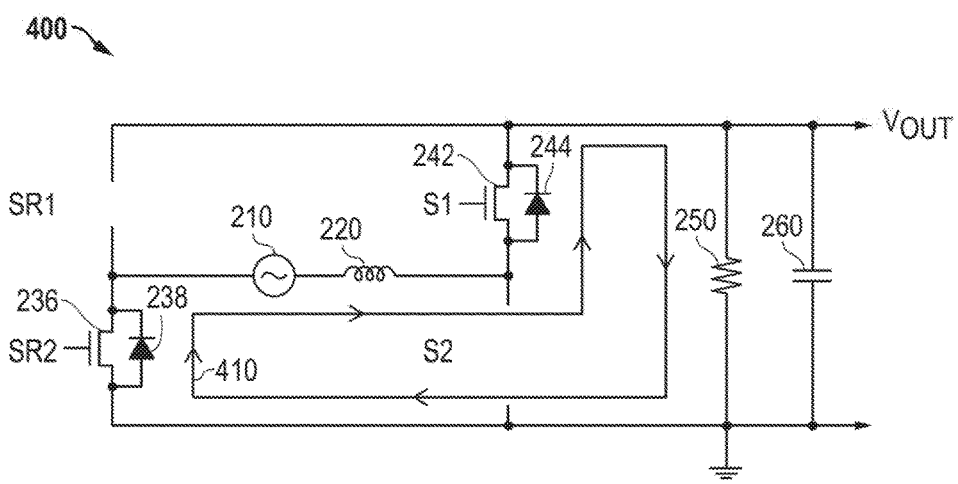
FIG. 4 illustrates in schematic form a current flow diagram of the bridgeless AC-DC converter of FIG. 2 during a second portion of the positive half-cycle of the AC input voltage.

FIG. 4 illustrates in schematic form a current flow diagram 400 of the bridgeless AC-DC converter of FIG. 2 during a second portion of the positive half-cycle of the AC input voltage. Current flow diagram 400 shows that the controller has made transistors 232 and 246 inactive and transistors 236 and 242 active, and AC voltage source 210 and inductor 220 conduct current into the load in a current loop 410.

Figure 5:
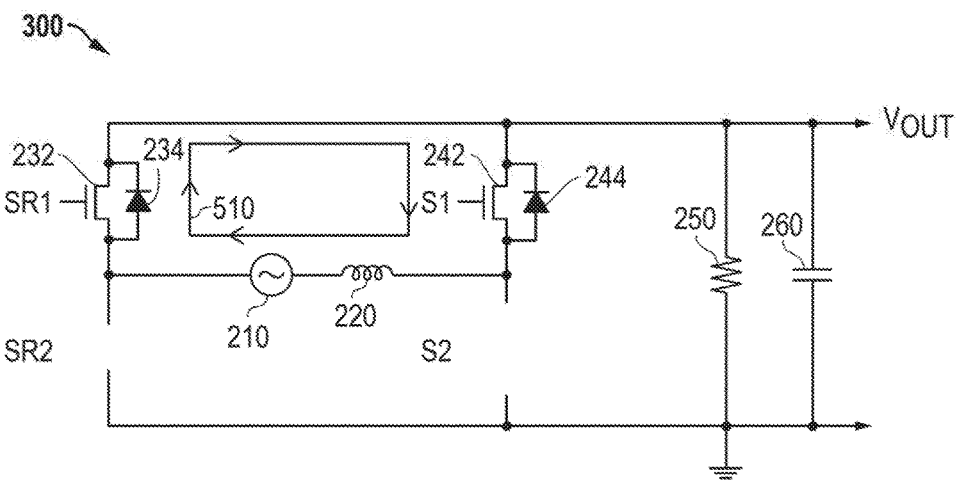
FIG. 5 illustrates in schematic form a current flow diagram of the bridgeless AC-DC converter of FIG. 2 during a first portion of a negative half-cycle of the AC input voltage.

FIG. 5 illustrates in schematic form a current flow diagram 500 of the bridgeless AC-DC converter of FIG. 2 during a first portion of a negative half-cycle of the AC input voltage. Current flow diagram 500 shows that the controller has made transistors 232 and 242 active and transistors 236 and 246 inactive, and bridgeless AC-DC converter 200 conducts current in a current loop 510. During this phase, inductor 220 builds up flux and stores energy between the second and first terminals thereof, and output capacitor 260 maintains $V_{OUT}$ by providing energy to the load. However in this phase, the current loop is floating with respect to bulk ground, and a resistor connected between the source of transistor 246 and bulk ground does not provide a ground referenced signal, making an implementation of cycle-by-cycle current limit difficult.

Figure 6:
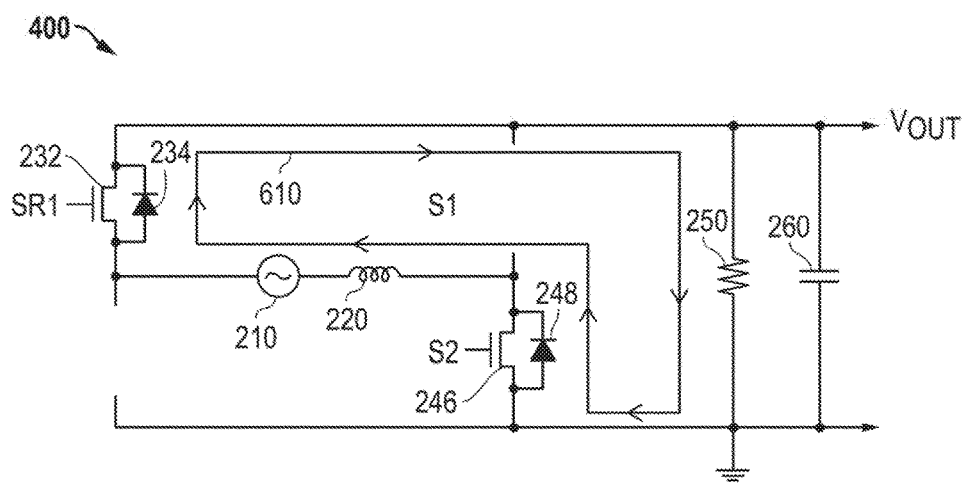
FIG. 6 illustrates in schematic form a current flow diagram of the bridgeless AC-DC converter of FIG. 2 during a second portion of a negative half-cycle of the AC input voltage.

FIG. 6 illustrates in schematic form a current flow diagram 600 of the bridgeless AC-DC converter of FIG. 2 during a second portion of the negative half-cycle of the AC input voltage. Current flow diagram 600 shows that the controller has made transistors 232 and 246 active and transistors 236 and 242 inactive, and bridgeless AC-DC converter 200 conducts current in a current loop 610. During this phase, AC voltage source 210 and inductor 220 provide energy into the load.

Some known totem-pole PFC converters overcome the floating current loop problem by placing a current transducer or a Hall effect sensor between the first terminal of inductor 220 and the first terminal of AC voltage source 210 and have used it to implement an average current mode control strategy. However these sensors are expensive, bulky, and bandwidth limited.

Figure 7:
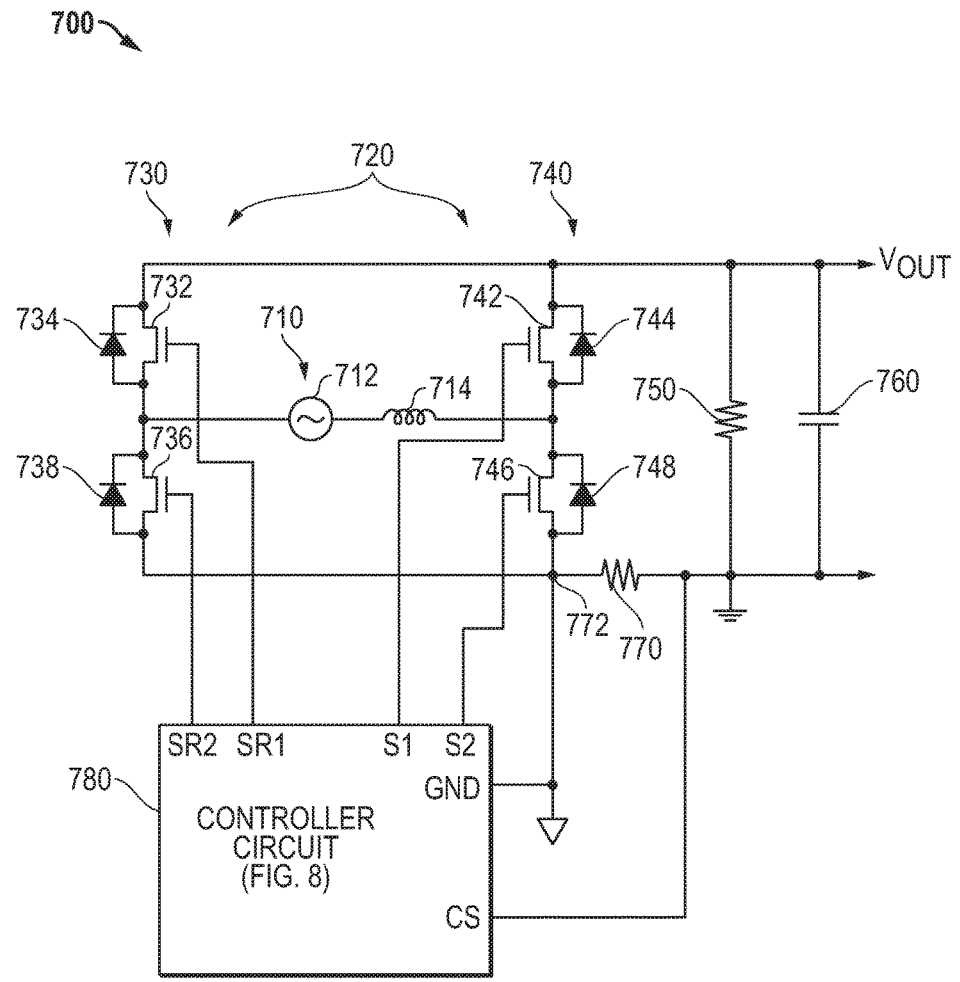
FIG. 7 illustrates in partial block diagram and partial schematic form a bridgeless AC-DC converter with power factor control according to an embodiment of the present invention.

FIG. 7 illustrates in partial block diagram and partial schematic form a bridgeless AC-DC converter 700 with power factor correction according to an embodiment of the present invention. Bridgeless AC-DC converter 700 uses a totem pole topology. Bridgeless AC-DC converter 700 includes generally an input voltage section 710, a totem pole network 720, a load 750, an output capacitor 760, a resistor 770, and a controller circuit 780.

Input voltage section 710 includes an AC voltage source 712 and an inductor 714. AC voltage source 712 has first and second terminals. Inductor 714 has a first terminal connected to the first terminal of AC voltage source 712, and a second terminal.

Totem pole network 720 includes a rectification leg 730 and a switching leg 740. Rectification leg 730 includes transistors 732 and 736. Transistor 732 is an N-channel power MOS transistor having a drain for providing output voltage $V_{OUT}$, a gate for receiving signal SR1, and a source connected to the second terminal of AC voltage source 712. Transistor 732 has an associated body diode 734 having an anode connected to the source of transistor 732, and a cathode connected to the drain of transistor 732. Transistor 736 is an N-channel power MOS transistor having a drain connected to the second terminal of AC voltage source 712, a gate for receiving signal SR2, and a source. Transistor 736 has an associated body diode 738 having an anode connected to the source of transistor 736, and a cathode connected to the drain of transistor 736.

Switching leg 740 includes transistors 742 and 746. Transistor 742 is an N-channel power MOS transistor having a drain connected to the drain of transistor 732, a gate for receiving signal S1, and a source connected to the first terminal of inductor 714. Transistor 742 has an associated body diode 744 having an anode connected to the source of transistor 742, and a cathode connected to the drain of transistor 742. Transistor 746 is an N-channel power MOS transistor having a drain connected to the second terminal of inductor 714, a gate for receiving signal S2, and a source connected to the source of transistor 736. Transistor 746 has an associated body diode 748 having an anode connected to a return terminal 772, and a cathode connected to the drain of transistor 746.

Load resistor 750 has a first terminal connected to the drains of transistors 732 and 742, and a second terminal connected to bulk ground. Capacitor 760 has a first terminal connected to the drains of transistors 732 and 742, and a second terminal connected to bulk ground. Resistor 770 has a first terminal connected to return terminal 772 and to the sources of transistors 736 and 746, and a second terminal connected to bulk ground. Controller circuit 780 has a first input terminal labeled "GND" that forms a signal ground terminal and is connected to return terminal 772, a second input terminal labeled "CS" that forms a current sense input terminal and is connected to the bulk ground terminal, and output terminals connected to the gates of transistors 732, 736, 742, and 746 for providing signals SR1, SR2, S1, and S2, respectively.

Bridgeless AC-DC converter 700 places resistor 770 in a return path to allow controller circuit 780 to measure the level of current during both phases of the AC signal. For a boost converter architecture as shown, average diode current indicates the load current. Controller circuit 780 connects return terminal 772 to its GND input, and the voltage difference between CS and GND is a voltage proportional to this current. Controller circuit 780 internally compares this voltage difference to a current limit threshold, and further determines the amount of time this voltage exceeds the current limit threshold. Controller circuit 780 uses the amount of time the current sense voltage exceeds the current limit threshold time to implement current limit protection in a way that will now be described.

Figure 8:
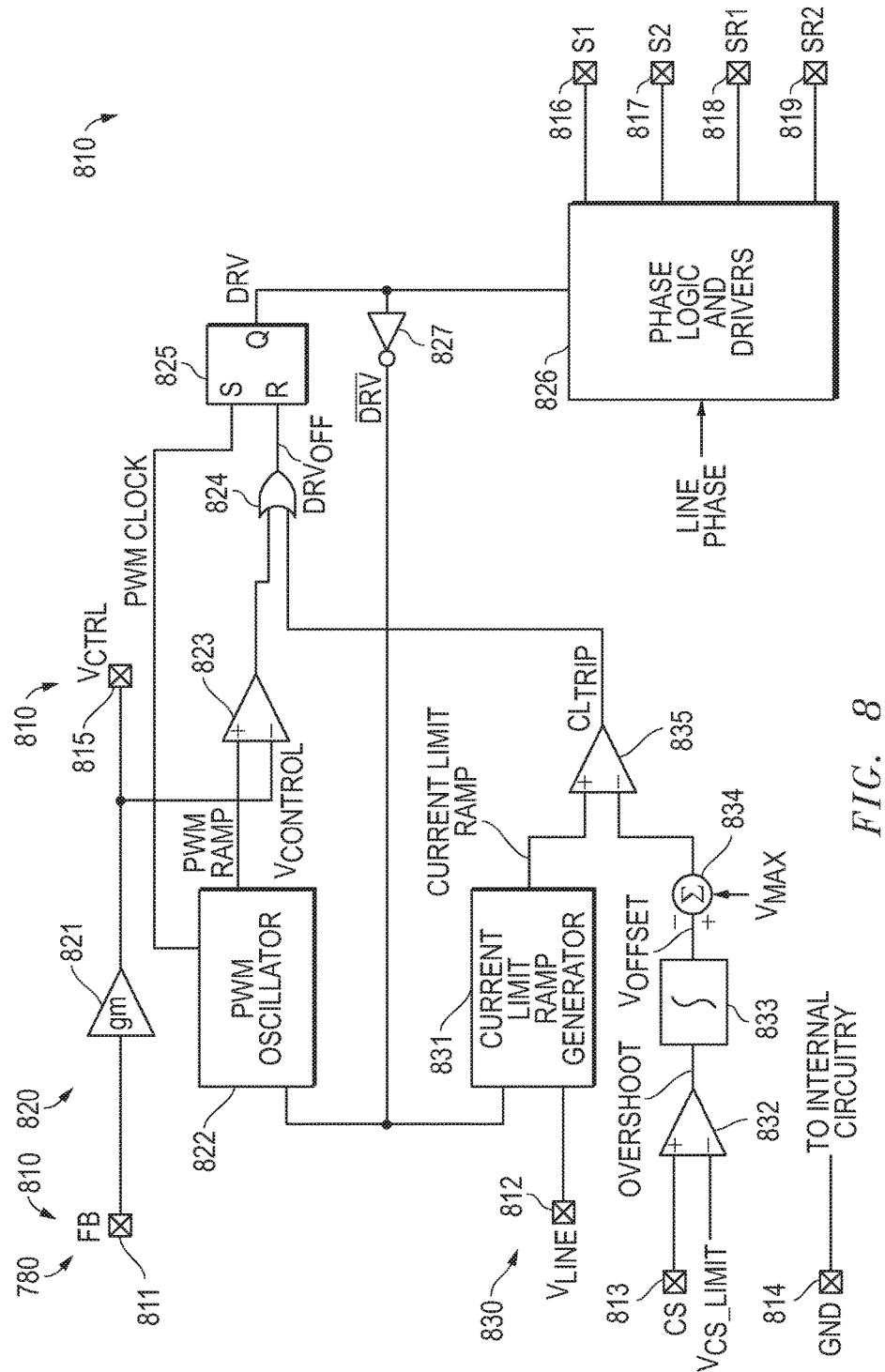
FIG. 8 illustrates in partial block diagram and partial schematic form the controller circuit of FIG. 7.

FIG. 8 illustrates in partial block diagram and partial schematic form controller circuit 780 of FIG. 7. In this example controller circuit 780 is implemented as a single integrated circuit chip and includes generally a set of integrated circuit terminals 810, a pulse width modulation circuit 820, and a current limit circuit 830. Integrated circuit terminals 810 include a feedback terminal 811 labeled "FB", a line voltage input terminal 812 labeled "$V_{LINE}$", a current sense terminal 813 (CS), a ground terminal 814 (GND), a control voltage terminal 815 labeled "$V_{CTRL}$", a first drive terminal 816 (S1), and a second drive terminal 817 (S2), a first rectification terminal 818 (SR1), and a second rectification terminal 819 (SR2)

Pulse width modulation circuit 820 includes a transconductance amplifier 821, a pulse width modulation (PWM) oscillator 822, a comparator 823, an OR gate 824, a PWM latch 825, a phase logic and drivers circuit 826, and an inverter 827. Transconductance amplifier 821 has an input connected to feedback terminal 811, and an output connected to control voltage terminal 815 for providing a voltage labeled "$V_{CONTROL}$". PWM oscillator 822 has a control input for receiving a complementary drive signal labeled "$\overline{DRV}$", a first output for providing a clock signal labeled "PWM CLOCK", and a second output for providing a ramp signal labeled "PWM RAMP". Comparator 823 has a positive input connected to the output of oscillator 822 for receiving the PWM RAMP signal, a negative input connected to the output of transconductance amplifier 821 for receiving the $V_{CONTROL}$ signal, and an output. OR gate 824 has a first input connected to the output of comparator 823, a second input for receiving a signal labeled "$CL_{TRIP}$", and an output. PWM latch 825 is an SR-type latch having an S input for receiving the PWM CLOCK, an R input connected to the output of OR gate 824, and an output for providing a true drive signal labeled "DRV". Phase logic and drivers circuit 826 has a first input for receiving the DRV signal, a second input for receiving a signal labeled "LINE PHASE", a first output connected to first drive terminal 816, a second output connected to second drive terminal 817, a third output connected to first rectification terminal 818, and a fourth output connected to second rectification terminal 819. Inverter 827 has an input for receiving true drive signal DRV, and an output for providing the $\overline{DRV}$ signal.

Current limit circuit 830 includes a current limit ramp generator 831, a comparator 832, an integrator 833, a summing device 834, and a comparator 835. Current limit ramp generator 831 has a first input for receiving the $\overline{DRV}$ signal, a second input connected to line voltage input terminal 812, and an output for providing a signal labeled "CURRENT LIMIT RAMP". Comparator 832 has a positive input connected to current sense terminal 813, a negative input terminal for receiving a reference voltage labeled "VCS_LIMIT", and an output for providing a signal labeled "OVERSHOOT". Integrator 833 has an input for receiving the OVERSHOOT signal, and an output for providing a signal labeled "$V_{OFFSET}$". Summing device 834 has a positive input for receiving a signal labeled "$V_{MAX}$", a negative input for receiving the $V_{OFFSET}$ signal, and an output. Comparator 835 has a positive input for receiving the CURRENT LIMIT RAMP signal, a negative input connected to the output of summing device 834, and an output connected to the second input of OR gate 824 for providing the $CL_{TRIP}$ signal.

In operation, pulse width modulation circuit 820 provides a signal to drive an appropriate one of transistors 742 and 746 with either the DRV signal or a complement of the DRV signal based on the phase of the AC line voltage indicated by the LINE PHASE signal. When in the positive half-cycle, the SR1 signal remains inactive and the SR2 signal remains active, and the S1 signal is active and the S2 signal is inactive during times identified by the DRV signal. Thus phase logic and drivers circuit 826 keeps its first output active and its second output inactive in response to the DRV signal. When in the negative half-cycle, the SR1 signal remains active and the SR2 signal remains inactive, and the S1 signal is active and the S2 signal is inactive during times identified by the DRV signal. Thus phase logic and drivers circuit 826 keeps its first output active and its second output inactive in response to the DRV signal. Pulse width modulation circuit 820 activates the DRV signal on the activation of the PWM clock signal, and deactivates the DRV signal based on either of two control loops.

The first control loop is a voltage control loop. The FB signal is indicative of the state of the output voltage. Controller circuit 780 receives the FB signal as a proportion of the output voltage, and uses a compensation network connected to voltage control pin 815 external to the integrated circuit for output filtering and compensation. Comparator 823 compares the $V_{CONTROL}$ signal to the PWM RAMP to selectively reset PWM latch 625.

The second control loop is a current limit control loop. The current control loop modulates the ON time, and therefore the power delivered to the load, according to the CS signal. Comparator 832 compares the CS signal (a voltage across resistor 770) to the $V_{CS\_LIMIT}$ signal to provide the OVERSHOOT signal in a high state when the CS signal exceeds the $V_{CS\_LIMIT}$ signal. Integrator 833 integrates the OVERSHOOT signal so that the $V_{OFFSET}$ signal is proportional to the amount of time that the OVERSHOOT signal is active. Summing device 834 subtracts this amount from the $V_{MAX}$ signal to provide the comparison level for comparator 835. Current limit ramp generator 831 provides a ramp signal whose slope is proportional to the line voltage sense on the $V_{LINE}$ signal.

Integrator 833 integrates the OVERSHOOT duration to provide $V_{OFFSET}$, and controller circuit 780 uses $V_{OFFSET}$ to limit the duty cycle in subsequent cycles. Pulse width modulation circuit 820 forms a regular PWM path for critical conduction mode (CrM) PFC control. The current limit path is provided by current limit circuit 830. The CURRENT LIMIT RAMP signal has a variable slope that is based on the line feed forward voltage ($V_{LINE}$) and is synchronized to PWM circuit 820. As the time the current overshoots the limit, labeled "$T_{OVERSHOOT}$" increases, $V_{OFFSET}$ increases. The difference between $V_{MAX}$ and $V_{OFFSET}$ decreases until the CURRENT LIMIT RAMP signal intersects it before the regular PWM path resets PWM latch 825 and terminates the DRV signal. Thus at this point, current limit circuit 830 takes over.

Thus controller circuit 780 uses current sense resistor 770 in a return path in which the controller ground, to which the current sense signal is referenced, is different from the bulk ground. Controller circuit 780 is able to provide bridgeless power factor control simply and without the need for multiple expensive current sense elements.

Figure 9:
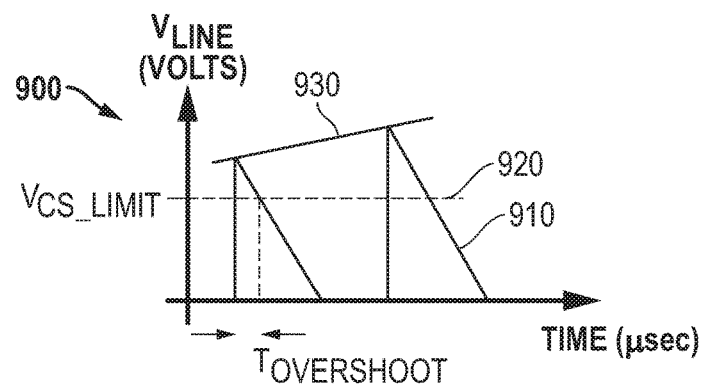
FIG. 9 illustrates a timing diagram useful in understanding the operation of the controller circuit of FIG. 7.

FIG. 9 illustrates a timing diagram 900 useful in understanding the operation of the controller circuit 780 of FIG. 7. In timing diagram 900, the horizontal axis represents time in microseconds (μsec), and the vertical axis represents both the CS signal and the $V_{LINE}$ signal in volts. Timing diagram 900 includes a waveform 910 that represents the CS signal, a voltage level 920 representing $V_{CS\_LIMIT}$, and a waveform 930 representing the $V_{LINE}$ signal. Note that FIG. 9 exaggerates the slope of the $V_{LINE}$ signal compared to typical 50/60 Hz systems to facilitate the discussion. $T_{OVERSHOOT}$ is the amount of time that CS exceeds $V_{CS\_LIMIT}$. As should be apparent from FIG. 9, as $V_{LINE}$ increases, $T_{OVERSHOOT}$ and $V_{OFFSET}$ increase, reducing the amount of time that DRV is active.

Figure 10:
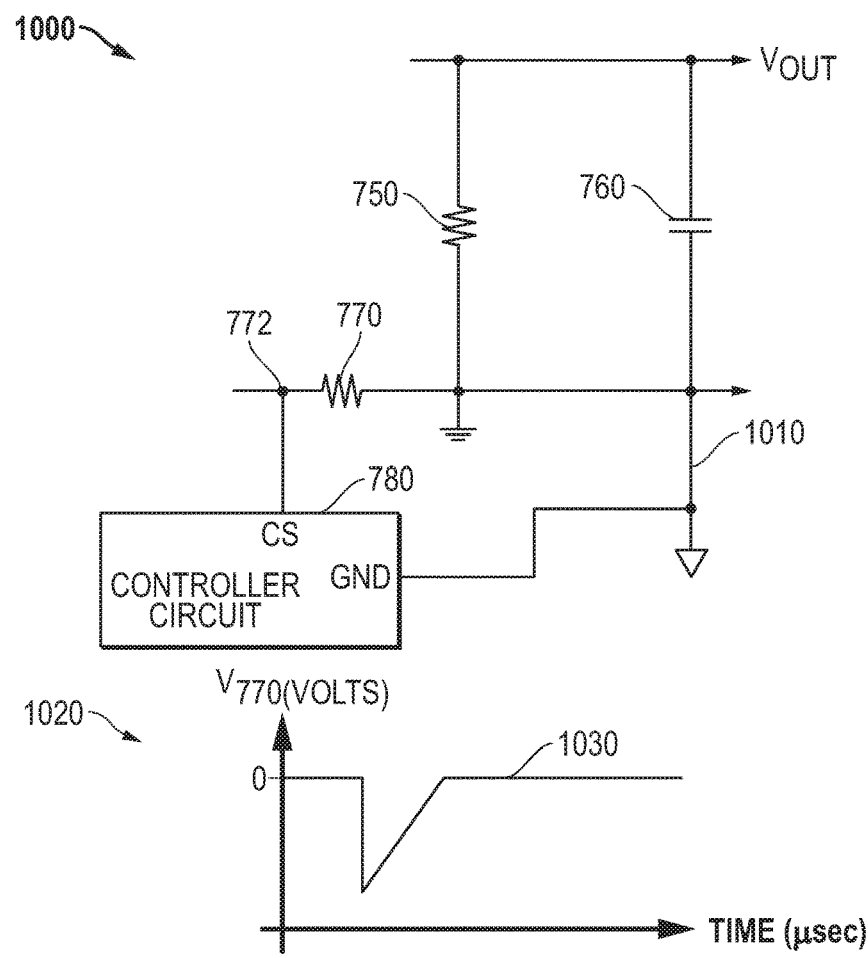
FIG. 10 illustrates in partial block diagram and partial schematic form a portion of a bridgeless AC-DC converter with power factor control and a timing diagram corresponding to the bridgeless AC-DC converter according to another embodiment of the present invention.

FIG. 10 illustrates in partial block diagram and partial schematic form a portion of a bridgeless AC-DC converter 1000 with power factor control and a timing diagram 1020 corresponding to bridgeless AC-DC converter 1000 according to another embodiment of the present invention. In FIG. 10, the CS terminal of controller circuit 780 is connected to the first terminal of resistor 770, and the GND terminal of controller circuit 780 is connected to the second terminal of resistor 770 through a new connection 1010. In timing diagram 1020, the horizontal axis represents time in μsec, and the vertical axis represents the voltage across resistor 770, i.e. the CS signal, in volts. A waveform 1030 shows that the polarity of $V_{770}$ is the opposite as that of FIG. 9, and the current limit circuit 830 determines $T_{OVERSHOOT}$ as the amount of the that $V_{770}$ is less than a corresponding current limit signal. The operation of controller circuit 780 is otherwise as described above.

Note that in actual embodiments, controller circuit 780 may have other features and be responsive to other signals to determine the existence of faults, establish certain modes of operation, etc., but these features are conventional and are not necessary to understand the relevant operation of controller circuit 780.

Figure 11:
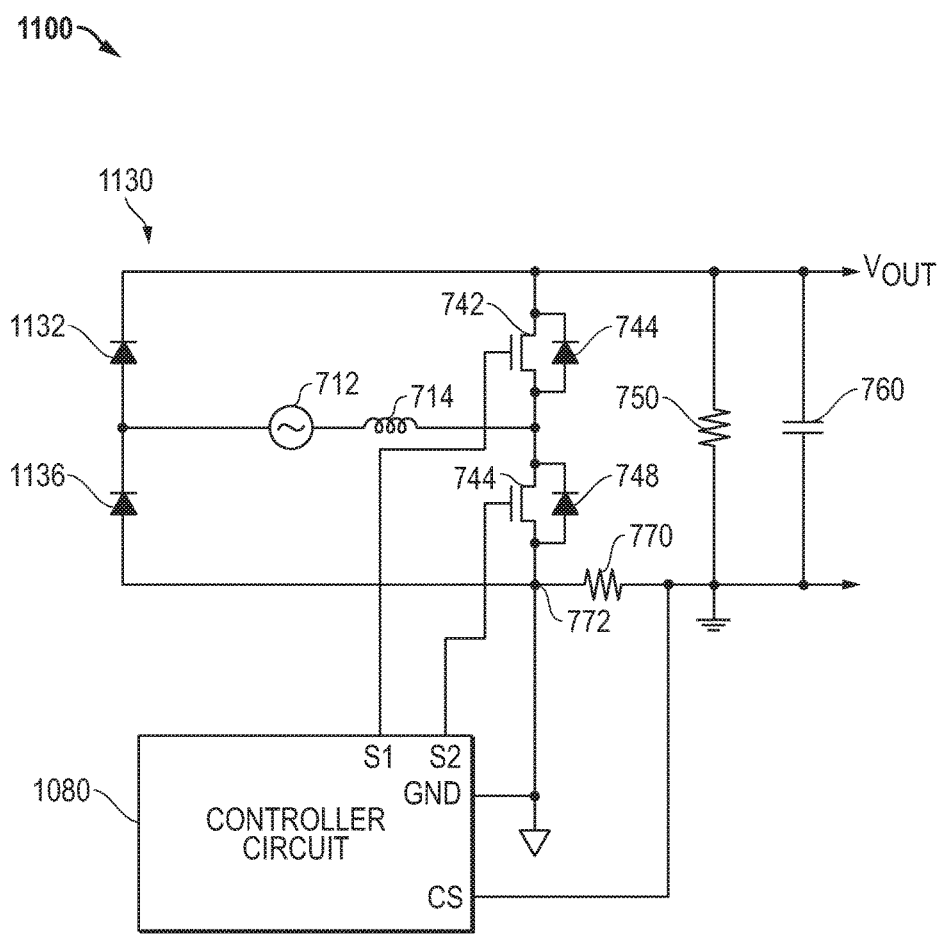
FIG. 11 illustrates in partial block diagram and partial schematic form a bridgeless AC-DC converter with power factor control according to still another embodiment.

FIG. 11 illustrates in partial block diagram and partial schematic form a bridgeless AC-DC converter 1100 with power factor control according to still another embodiment. Bridgeless AC-DC converter 1100 is the same as bridgeless AC-DC converter 700 of FIG. 7 except it uses a different rectification leg 1130. Rectification leg 1130 includes diodes 1132 and 1136. Diode 1132 has a cathode for providing output voltage $V_{OUT}$, and an anode connected to the second terminal of AC voltage source 712. Diode 1136 has a cathode connected to the second terminal of AC voltage source 712, and an anode connected to the first terminal of resistor 770. Bridgeless AC-DC converter 1100 operates the same as bridgeless AC-DC converter 700 except that diodes 1132 and 1136 replace transistors 732 and 736 of FIG. 7. Thus controller circuit 1080 requires fewer integrated circuit terminals, but at the expense of higher power dissipation in diodes 1132 and 1136.

Thus various embodiments of a bridgeless AC-DC converter with power factor correction have been described. The converter uses a single resistor in a return path as a current sense element, avoiding the need for multiple pins and current sense resistors or expensive current sense elements.

The above-disclosed subject matter is to be considered illustrative, and not restrictive, and the appended claims are intended to cover all such modifications, enhancements, and other embodiments that fall within the true scope of the claims. For example, the controller circuit can have various other protection mechanisms that are known in the art but are not specifically described herein. Transistors of opposite conductivity types can be used with appropriate inversion of the respective control signals. Moreover the polarity of the sense resistor in the return path can be reversed. In some embodiments, the rectification leg can be implemented with diodes instead of transistors. Also other types of sense elements besides resistors can be used, such as current sense transformers, Hall-effect sensors, and the like.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A bridgeless AC-DC converter, comprising:
   a totem pole network having a first input adapted to be coupled to a second terminal of an AC voltage source, a second input adapted to be coupled to a first terminal of said AC voltage source through an inductor, an output terminal for providing an output voltage, and a return terminal;
   an output capacitor having a first terminal coupled to said output terminal, and a second terminal coupled to a bulk ground terminal;
   a sense element coupled between said return terminal and said bulk ground terminal; and
   a controller circuit coupled to said return terminal of said totem pole network, wherein said controller circuit modulates an on time of an active switch in said totem pole network on a cycle-by-cycle basis by shortening said on time corresponding to an amount of time a current sense signal derived from a current through said sense element exceeds a current limit threshold.

2. The bridgeless AC-DC converter of claim 1, wherein said controller circuit comprises:
   a current sense input terminal adapted to be coupled to said return terminal;
   a ramp generator having an output terminal for providing a ramp signal;
   a first comparator having a first terminal coupled to said current sense input terminal, a second terminal for receiving said current limit threshold, and an output terminal;
   an integrator having an input terminal coupled to said output terminal of said first comparator, and an output terminal, wherein said integrator integrates an amount of time said output terminal of said first comparator is active to provide an offset signal;
   a summing device for forming a current sense limit signal in response to a difference between a predetermined voltage and said offset signal;
   a second comparator having a positive input for receiving said ramp signal, a negative input for receiving said current sense limit signal, and an output terminal for providing a current limit trip signal; and
   a pulse width modulation circuit responsive to a feedback signal to determine an on time of said active switch, and responsive to said current limit trip signal to terminate said on time of said active switch on a cycle-by-cycle basis.

3. The bridgeless AC-DC converter of claim 2, wherein said integrator integrates said amount of time said output terminal of said first comparator is active over a half line cycle of said AC voltage source.

4. The bridgeless AC-DC converter of claim 2, wherein said ramp generator generates a ramp signal whose slope varies in response to a line voltage.

5. The bridgeless AC-DC converter of claim 1, wherein said totem pole network comprises:
   a rectification leg having a first terminal coupled to an output terminal, a second terminal adapted to be coupled to a second terminal of an AC voltage source, and a third terminal coupled to a current sense terminal; and
   a switching leg having a first terminal coupled to said output terminal, a second terminal adapted to be coupled to a first terminal of said AC voltage source through said inductor, and a third terminal coupled to said current sense terminal.

6. The bridgeless AC-DC converter of claim 5, wherein said rectification leg comprises:
   a first transistor having a first current electrode coupled to said output terminal, a control electrode coupled to said controller circuit, and a second current electrode coupled to said second terminal of said AC voltage source; and
   a second transistor having a first current electrode coupled to said second terminal of said AC voltage source, a control electrode coupled to said controller circuit, and a second current electrode coupled to said current sense terminal,
   wherein said controller circuit activates said second transistor and keeps said first transistor inactive during a positive half-cycle of said AC voltage source, and activates said first transistor and keeps said second transistor inactive during a negative half-cycle of said AC voltage source.

7. The bridgeless AC-DC converter of claim 6, wherein:
   said first transistor of said rectification leg comprises a first body diode having an anode formed by said second terminal of said first transistor, and a cathode coupled formed by said first terminal of said first transistor; and
   said second transistor of said rectification leg comprises a second diode having an anode coupled to said second terminal of said second transistor, and a cathode coupled to said first terminal of said first transistor.

8. The bridgeless AC-DC converter of claim 5, wherein said rectification leg comprises:
   a first diode having a cathode coupled to said output terminal, and an anode coupled to said second terminal of said AC voltage source; and
   a second diode having a cathode coupled to said second terminal of said AC voltage source, and an anode coupled to said current sense terminal.

9. The bridgeless AC-DC converter of claim 5, wherein said switching leg comprises:
   a first transistor having a first current electrode coupled to said output terminal, a control electrode coupled to said controller circuit, and a second current electrode coupled to said first terminal of said AC voltage source; and
   a second transistor having a first current electrode coupled to said first terminal of said AC voltage source, a control electrode coupled to said controller circuit, and a second current electrode coupled to said current sense terminal,
   wherein said controller circuit switches on said second transistor at a switching frequency during a duty period and switches on said first transistor during a complement of said duty period during a positive half-cycle of said AC voltage source, and switches on said second transistor at said switching frequency during said complement of said duty period and switches on said first transistor during said duty period during a negative half-cycle of said AC voltage source.

10. The bridgeless AC-DC converter of claim 9, wherein:
    said first transistor of said switching leg comprises a first body diode having an anode formed by said second terminal of said first transistor, and a cathode coupled formed by said first terminal of said first transistor; and
said second transistor of said switching leg comprises a second diode having an anode coupled to said second terminal of said second transistor, and a cathode coupled to said first terminal of said first transistor.

11. The bridgeless AC-DC converter of claim 1, wherein: said sense element comprises a sense resistor.

12. The bridgeless AC-DC converter of claim 1, wherein said controller circuit and said return terminal are coupled to a signal ground terminal, and said current sense signal is a voltage between said second terminal of said sense element and said signal ground terminal.

13. The bridgeless AC-DC converter of claim 1, wherein said bulk ground terminal is coupled to a signal ground terminal, and said current sense signal is a voltage between said first terminal of said sense element and said signal ground terminal.

14. A bridgeless AC-DC converter, comprising:
a first transistor having a first current electrode coupled to an output terminal, a control electrode, and a second current electrode adapted to be coupled to a second terminal of an AC voltage source; and
a second transistor having a first current electrode adapted to be coupled to said second terminal of said AC voltage source, a control electrode, and a second current electrode coupled to a return terminal,
a third transistor having a first current electrode coupled to said output terminal, a control electrode, and a second current electrode adapted to be coupled to a first terminal of said AC voltage source through an inductor; and
a fourth transistor having a first current electrode adapted to be coupled to said first terminal of said AC voltage source through said inductor, a control electrode, and a second current electrode coupled to a return terminal;
an output capacitor having a first terminal coupled to said output terminal, and a second terminal coupled to a bulk ground terminal;
a sense element coupled between said return terminal and said bulk ground terminal; and
a controller circuit coupled to said return terminal and to said control electrodes of each of said first, second, third, and fourth transistors, wherein said controller circuit modulates an on time of an active switch of said fourth transistor during a positive half-cycle and said third transistor during a negative half-cycle on a cycle-by-cycle basis by shortening said on time corresponding to an amount of time a voltage on said return terminal exceeds a current limit threshold.

15. The bridgeless AC-DC converter of claim 14, wherein said controller circuit modulates said on time of said active switch on a cycle-by-cycle basis by shortening said on time according to an amount of time said voltage on said return terminal exceeds a current limit threshold.

16. The bridgeless AC-DC converter of claim 14, wherein:
said controller circuit activates said second transistor and keeps said first transistor inactive during a positive half-cycle of said AC voltage source; and
said controller circuit activates said first transistor and keeps said second transistor inactive during a negative half-cycle of said AC voltage source.

17. The bridgeless AC-DC converter of claim 14, further comprising:

a first free-wheeling diode having an anode coupled to said second terminal of said third transistor, and a cathode coupled to said first terminal of said third transistor; and
a second free-wheeling diode having an anode coupled to said second terminal of said fourth transistor, and a cathode coupled to said first terminal of said fourth transistor,
wherein said controller circuit switches on said second transistor at a switching frequency during a duty period and switches on said first transistor during a complement of said duty period during a positive half-cycle of said AC voltage source, and switches on said second transistor at said switching frequency during said complement of said duty period and switches on said first transistor during said duty period during a negative half-cycle of said AC voltage source.

18. The bridgeless AC-DC converter of claim 14, wherein:
said second current electrode of said third transistor and said first current electrode of said fourth transistor are coupled to said first terminal of said AC voltage source through a boost inductor.

19. A method for rectifying an AC signal in a bridgeless AC-DC converter having an AC voltage source in series with an inductor, comprising:
alternatively switching a second terminal of the AC voltage source to an output terminal during a negative half-cycle of the AC voltage source and to a return terminal during a positive half-cycle of said AC voltage source;
coupling a first terminal of the inductor, to a first terminal of the AC voltage source;
coupling a second terminal of the inductor to a return terminal at a switching frequency during a duty period and to said output terminal at said switching frequency during a complement of said duty period during positive half cycle of the AC voltage source;
coupling said second terminal of the inductor to said output terminal at said switching frequency during said duty period and to said return terminal at said switching frequency during a complement of said duty period during negative half cycle of said AC voltage source;
coupling a sense element between said return terminal and a bulk ground terminal;
comparing a voltage across said sense element to a current limit threshold; and
shortening a duty cycle on a cycle-by-cycle basis in response to said comparing.

20. The method of claim 19, wherein said shortening said duty cycle comprises:
generating a ramp signal;
integrating an amount of time that said voltage on said return terminal exceeds said current limit threshold to provide an offset signal;
subtracting said offset signal from a predetermined voltage to provide a current sense limit signal;
providing a current limit trip signal when said ramp signal exceeds said current sense limit signal; and
shortening said duty cycle on said cycle-by-cycle basis in response to said current limit trip signal.

21. The method of claim 19, wherein said coupling said sense element between said bulk ground terminal and said return terminal comprises:
coupling a resistor between said bulk ground terminal and said return terminal.

22. The method of claim 19, wherein said coupling said sense element between said bulk ground terminal and said return terminal comprises:

coupling a current sense transformer between said bulk ground terminal and said return terminal.

\* \* \* \* \*